No. 870,666. PATENTED NOV. 12, 1907.
DE WITT COOKINGHAM.
VEHICLE BRAKE.
APPLICATION FILED JUNE 23, 1906.
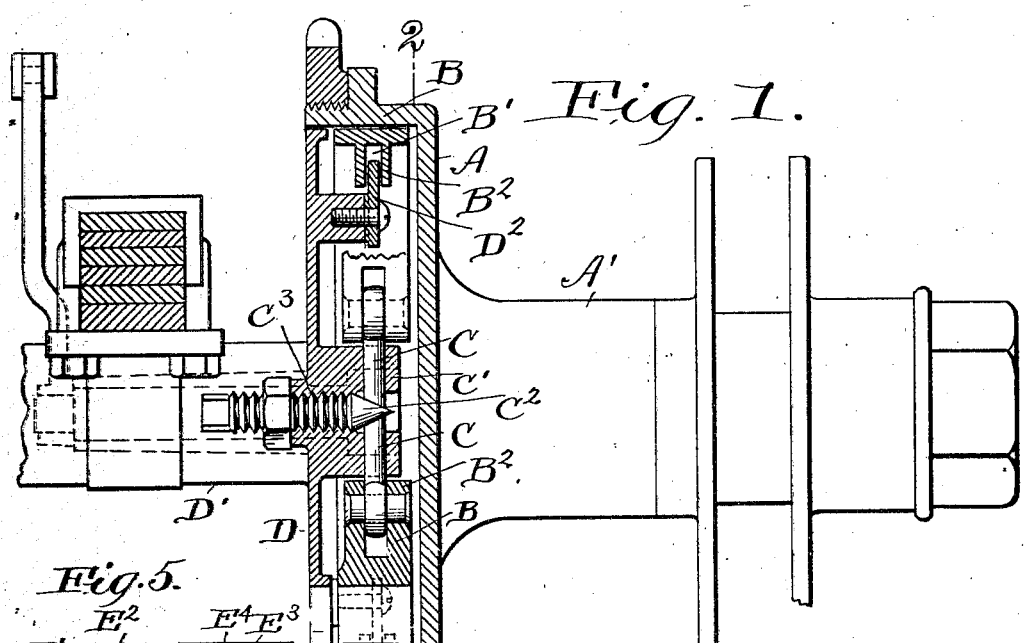
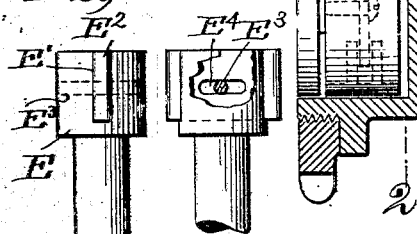
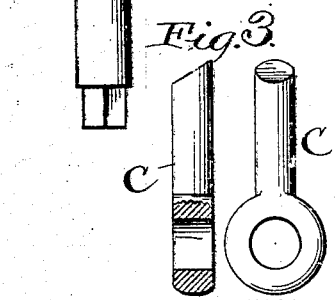
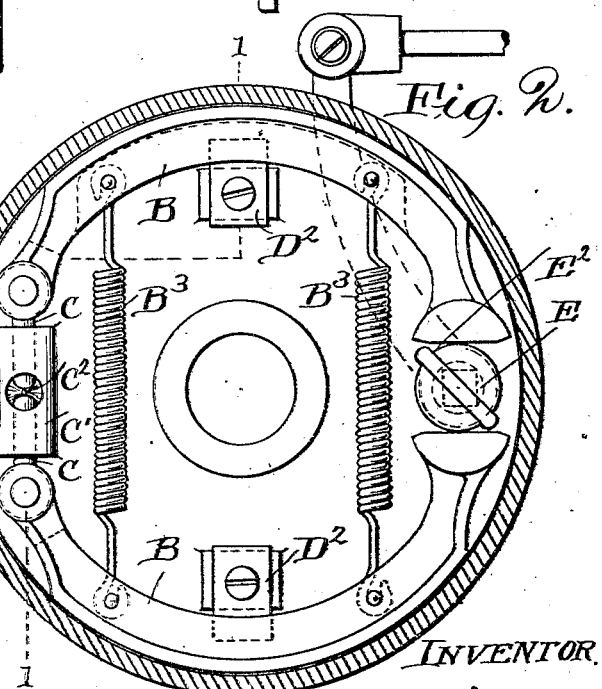
WITNESSES. INVENTOR

UNITED STATES PATENT OFFICE.

DE WITT COOKINGHAM, OF CLEVELAND, OHIO, ASSIGNOR OF ONE-HALF TO JOHN H. HERTNER, OF CLEVELAND, OHIO.

VEHICLE-BRAKE.

No. 870,666.　　　　Specification of Letters Patent.　　　Patented Nov. 12, 1907.

Application filed June 23, 1906. Serial No. 323,023.

*To all whom it may concern:*

Be it known that I, DE WITT COOKINGHAM, a citizen of the United States, residing at Cleveland, in the county of Cuyahoga and State of Ohio, have invented a certain new and useful Improvement in Vehicle-Brakes, of which the following is a full, clear, and exact description.

The object of the present invention is to provide an improved brake for vehicles, and particularly relates to certain details of construction to be hereinafter pointed out.

In that type of brake, commonly used on automobiles, in which the brake frame is rigidly attached to the wheel and is of a box-like structure inclosing pivoted arcual brake shoes which are supported by a plate or part fixed to the vehicle frame, it has been found that an important problem is presented in the endeavor to secure adjustability to take up wear on the brake shoes. It is of course, obvious, that the wear must be taken up in some manner; otherwise, the shoes will cease to operate; and it has been a common thing to mount a pair of arcual shoes on pivots fixed on a supporting plate and spread the shoes apart by a rotary cam interposed between them at their free ends. As such shoes wear, the operator depends upon turning the cam somewhat further than before, so as to force them into operative engagement with the brake frame. This arrangement is undesirable, for the reason that cams constructed to take up such wear, are not, before such wear takes place, capable of being turned quite far enough to secure the desired wedging leverage. Consequently, it has been sought to secure the adjustment for taking up wear at the pivoted end of the brake shoes, and turnbuckles have been provided for this purpose. But with turnbuckles, and all the structures heretofore known to the art for accomplishing this result, it is necessary to dismantle the brake frame in order to effect the adjustment. The undesirability of this, of course, is obvious, since it might well happen that it would become necessary to tighten up the brake at a time and under conditions where it might not be possible to dismantle the brake frame.

I have devised a structure whereby the brake shoes may be adjusted to a proper fit without dismantling the brake frame, and furthermore, I have accomplished this in such manner that the brake frame may retain its character of a closed box and thus be dust and waterproof, which characteristic is of the highest importance, as is well known to those acquainted with the practical operation of such devices.

Referring to the accompanying drawings, which illustrate an embodiment of my invention, Figure 1 represents a vertical section of a brake in which my device is used, the section being taken along line 1—1 of Fig. 2. Fig. 2 is a sectional view of the same taken along the line 2—2 of Fig. 1. Fig. 3 is a side view, partly in section, of one of the adjustable eye pins to which the brake shoes are pivoted. Fig. 4 is a face view of the same. Fig. 5 is an elevation of the spreading head, or cam, used to spread the brake shoes apart. Fig. 6 is a view of the same at right angles to Fig. 5, partly broken away.

In the various figures it will be seen that the brake frame A is a box-like structure rigidly connected with the hub A' of the wheel. This frame incloses a pair of arcual brake shoes B B suitably pivoted to eye pins C C, which pins in turn, are slidably mounted in a boss C' projecting from a supporting plate D which is carried by and rigidly connected with a vehicle frame D'. Each of the shoes has a longitudinal channel B' formed by webs $B^2$ projecting from the interior side thereof. Positioning lugs $D^2$ $D^2$ fixed to the supporting plate, project into there channels and hold the brake shoes in alinement. A pair of tension springs $B^3$ $B^3$ secured near opposite ends of the shoes, tend to draw them together. Interposed between the free ends of the shoes, is a spreading head or cam E mounted in the usual manner and under the control of the driver.

The pivoted end of the shoes will, under the tension of the spring, move toward each other, since the eye pins, to which they are respectively pivoted, are free to slide in the boss in which they are mounted, and these eye pins will of course be drawn toward each other until they abut, unless some other object intervenes. But, it will be seen by referring to Fig. 1, that these eye pins have interposed between them, a cone $C^2$, which is adjustable by reason of having a screw-threaded stem $C^3$, extending through the supporting plate D so that it may be moved in or out, and thus regulate the distance of separation for the two pins. The inner ends of the pins are beveled so as to afford a proper bearing surface for the adjusting cone.

It will be seen that this structure provides means whereby the pivoted ends of the shoes may be allowed to approach each other until the eye pins C C come in contact, and thus permit the spreading cam E to be so constructed that it can turn to the wedging point and afford means whereby the brake shoes may be adjusted after wear without depending upon the spreading cam to take up such wear. And it will be further noted that this adjustment is under immediate and ready control and capable of being manipulated without dismantling the brake frame or disturbing it in any manner; and furthermore, this is accomplished in a way which permits the brake frame to be dust and waterproof since no open parts and no communications are necessary between the exterior and interior for the purpose of effecting the desired adjustment.

A further improvement in connection with my brake resides in the spreading cam itself. As seen in Figs.

2, 5 and 6, this cam consists of a cylindrical head E having a transverse slot E' with a plate E² interposed in said slot. I secure this plate E³ against accidental movement out of the slot E' by means of a pin E³ running through the head and the plate; but it will be seen in Fig. 6 that I have provided the plate E² with an elongated opening E⁴ through which the pin passes thereby allowing the plate to have a certain amount of lateral movement.

I have been led to design this structure by reason of the fact that in the cams heretofore used in this type of brake, the two cam surfaces have been rigidly fixed, so that, upon turning the spreading head, the engagement of one cam surface with its brake shoe would be absolutely independent of the engagement of the other cam surface with its shoe. Of course, simultaneous engagement has always been sought, but can only be secured through very careful construction, and this has not always been attained. When one cam surface bears against its shoe, so as to force the latter into full engagement with the brake frame, it is evident that, if the opposite cam does not simultaneously force the second shoe into full engagement with the brake frame, the reaction of the thrust must be borne entirely by the bearings of the spreading head or cam itself, which tends to wear the same and is undesirable for many reasons, among others, increasing the liability of breakage.

In the form which I have devised, it is insured that both brake shoes shall be in full engagement with the brake frame at all times when the spreading cam is turned, since the ends of the shiftable plate form the surfaces which spread the shoes apart and the reaction of the thrust against either shoe must be received and borne by the opposite shoe, and consequently simultaneous action of the shoes is secured, and this is done without strain to the bearings of the spreading head itself.

It is evident that some modifications can be made in the detail structure of the device as described, and I therefore desire it to be understood that I regard my invention as being directed to the broad idea expressed in the preceding specification and the following claims.

Having described my invention, I claim:

1. In a vehicle brake, a brake frame and brake shoes adapted to frictionally engage said frame, a member on which the said shoes are pivotally supported, means for forcing the shoes into engagement with the brake frame, said shoes being wholly incased, and means accessible from the exterior of the incasing structure adapted to move the shoes toward the brake frame at the pivotal points.

2. In a vehicle brake, a brake frame and a plate forming a closed casing, brake shoes pivotally mounted so as to be carried by the supporting plate and inclosed within the casing, and means accessible from the exterior of the casing adapted to advance the brake shoes toward the brake frame at their pivotal points.

3. In a vehicle brake, a brake frame and brake shoes, and means adapted to force said shoes into engagement with the brake frame comprising a member slidably mounted on a rotatable head and positioned to transmit thrust to each shoe upon rotation of said head, the reaction from each shoe being transmitted to the other shoe.

4. In a vehicle brake, a brake frame inclosing two brakes pivotally supported and adapted to engage the frame when forced apart, means for forcing them apart comprising a rotatable head having a bar slidably mounted thereon, and positioned to engage said shoes upon rotation of the said head.

In testimony whereof, I hereunto affix my signature in the presence of two witnesses.

DE WITT COOKINGHAM.

Witnesses:
J. M. WOODWARD,
E. B. GILCHRIST.